United States Patent
Imahori et al.

(10) Patent No.: US 9,187,589 B2
(45) Date of Patent: Nov. 17, 2015

(54) 2, 3, 3, 3-TETRAFLUOROPROPENE COPOLYMER

(75) Inventors: Yuji Imahori, Settsu (JP); Katsuhiko Imoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 194 days.

(21) Appl. No.: 13/638,495

(22) PCT Filed: Mar. 30, 2011

(86) PCT No.: PCT/JP2011/058014
§ 371 (c)(1),
(2), (4) Date: Sep. 28, 2012

(87) PCT Pub. No.: WO2011/125740
PCT Pub. Date: Oct. 13, 2011

(65) Prior Publication Data
US 2013/0023636 A1  Jan. 24, 2013

(30) Foreign Application Priority Data
Mar. 31, 2010 (JP) .................................. 2010-083125

(51) Int. Cl.
*C08F 214/18* (2006.01)
*C08F 214/26* (2006.01)

(52) U.S. Cl.
CPC ........... *C08F 214/265* (2013.01); *C08F 214/18* (2013.01); *C08F 214/182* (2013.01); *C08F 214/184* (2013.01); *C08F 214/186* (2013.01); *C08F 214/188* (2013.01)

(58) Field of Classification Search
CPC .............. C08F 214/182; C08F 214/186; C08F 214/188
See application file for complete search history.

(56) References Cited

U.S. PATENT DOCUMENTS

| | | | |
|---|---|---|---|
| 3,586,552 A | 6/1971 | Potts et al. | |
| 6,133,389 A * | 10/2000 | Anolick et al. | ............... 526/206 |
| 2004/0142286 A1 | 7/2004 | French et al. | |
| 2005/0214453 A1 | 9/2005 | Kawanishi | |
| 2008/0153978 A1* | 6/2008 | Samuels et al. | ................ 525/55 |
| 2008/0207861 A1* | 8/2008 | Bauerle et al. | ............... 526/247 |
| 2012/0208007 A1* | 8/2012 | Mukhopadhyay et al. | ... 428/332 |
| 2013/0345381 A1* | 12/2013 | Amin-Sanayei et al. | ..... 526/209 |

FOREIGN PATENT DOCUMENTS

| | | |
|---|---|---|
| JP | 11-501685 A | 2/1999 |
| JP | 2003-514955 A | 4/2003 |
| JP | 2003-514956 A | 4/2003 |
| JP | 2004-536171 A | 12/2004 |
| JP | 2005-283628 A | 10/2005 |
| WO | 9624624 A2 | 8/1996 |
| WO | 0137043 A1 | 5/2001 |
| WO | 0137044 A1 | 5/2001 |

OTHER PUBLICATIONS

Office Action for counterpart CN Appln. No. 201180016590.1 issued on Feb. 14, 2014.
Teruo Takakura; "Tetrafluoroethylene copolymer"; Organofluorine Industry; vol. 3; Dec. 31, 1998; pp. 48-52.
English translation of the International Preliminary Report on Patentability and Written Opinion of the ISA issued Nov. 13, 2012 for corresponding International Application No. PCT/JP2011/058014.

* cited by examiner

*Primary Examiner* — Nicole M Buie-Hatcher
(74) *Attorney, Agent, or Firm* — Sughrue Mion, PLLC

(57) ABSTRACT

The present invention provides a novel copolymer of 2,3,3,3-tetrafluoropropene and a non-fluorinated ethylenic hydrocarbon monomer. The copolymer contains (A) a 2,3,3,3-tetrafluoropropene unit and (B) a non-fluorinated ethylenic hydrocarbon monomer unit. The copolymerization ratio (mol % ratio) of (A) and (B) is 99.9:0.1 to 0.1:99.9 and the number average molecular weight of the copolymer is 1000 to 1000000.

1 Claim, No Drawings

2, 3, 3, 3-TETRAFLUOROPROPENE COPOLYMER

TECHNICAL FIELD

The present invention relates to a copolymer of 2,3,3,3-tetrafluoropropene and a non-fluorinated ethylenic hydrocarbon monomer.

Conventionally, 2,3,3,3-tetrafluoropropene (HFO-1234yf) is considered as a relatively stable compound, and used as a compound for a refrigerant or an electrical heating fluid.

Since 2,3,3,3-tetrafluoropropene itself has relatively low radical polymerizability, there are not many documents concerning copolymers of 2,3,3,3-tetrafluoropropene and other monomers, and only some documents concerning copolymers of 2,3,3,3-tetrafluoropropene and fluoromonomers (Patent Literatures 1 to 4) are known.

CITATION LIST

Patent Literature

Patent Literature 1: JP 2004-536171 T
Patent Literature 2: JP 2003-514955 T
Patent Literature 3: JP 2003-514956 T
Patent Literature 4: JP 11-501685 T

SUMMARY OF INVENTION

Technical Problem

The present invention aims to provide a novel copolymer of 2,3,3,3-tetrafluoropropene and a non-fluorinated ethylenic hydrocarbon monomer.

Solution to Problem

The copolymer of 2,3,3,3-tetrafluoropropene and a non-fluorinated ethylenic hydrocarbon monomer according to the present invention is a copolymer of (A) 2,3,3,3-tetrafluoropropene and (B) a non-fluorinated ethylenic hydrocarbon monomer. A copolymerization ratio (molar ratio %) of (A):(B) is 99.9:0.1 to 0.1:99.9. A number average molecular weight of the copolymer is 1000 to 1000000.

Advantageous Effects of Invention

The present invention can provide a novel copolymer of 2,3,3,3-tetrafluoropropene and a non-fluorinated ethylenic hydrocarbon monomer, using 2,3,3,3-tetrafluoropropene which has not been rarely noted as a fluoroolefin before.

The copolymer of the present invention is expected to have various applications as a substitute for a copolymer of tetrafluoroethylene (TFE) and an ethylenic hydrocarbon monomer and a copolymer of chlorotrifluoroethylene (CTFE) and an ethylenic hydrocarbon monomer.

DESCRIPTION OF EMBODIMENTS

The copolymer of 2,3,3,3-tetrafluoropropene according to the present invention is a novel copolymer of (A) 2,3,3,3-tetrafluoropropene and (B) a non-fluorinated ethylenic hydrocarbon monomer, which has not been disclosed in any documents. The copolymerization ratio (mol % ratio) of (A):(B) is 99.9:0.1 to 0.1:99.9, and the number average molecular weight of the copolymer is 1000 to 1000000.

The 2,3,3,3-tetrafluoropropene is a non-perfluoroolefin represented by the following formula:

$$CH_2\!=\!CF\!-\!CF_3$$

and is different from 1,3,3,3-tetrafluoropropene which is a constitutional isomer and represented by the following formula:

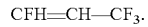
$$CFH\!=\!CH\!-\!CF_3.$$

The 2,3,3,3-tetrafluoropropene itself forms a structural unit which is amorphous and transparent. Therefore, the copolymer of the present invention can be either amorphous or crystalline by selecting a non-fluorinated ethylenic hydrocarbon monomer (B). In addition, the copolymer of the present invention can be either an elastomer or a non-elastomer by selecting a proper non-fluorinated ethylenic hydrocarbon monomer (B).

The above non-fluorinated ethylenic hydrocarbon monomer (B) is preferably one or more of monomers represented by the following formulas (Ia) to (Ic).

A monomer represented by the formula (Ia) is an ether compound containing a carbon-carbon unsaturated group represented by the following formula (Ia):

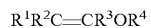
$$R^1R^2C\!=\!CR^3OR^4$$

wherein $R^1$, $R^2$, and $R^3$ are the same as or different from each other, and each are H or a C1 to C10 alkyl group which may have a ring structure; and $R^4$ is a C1 to C20 alkyl group which may have at least one of a functional group and a ring structure.

In the formula (Ia), examples of the ring structure of $R^1$ to $R^4$ include cyclohexyl groups and aryl groups. The function group for $R^4$ can be exemplified by hydroxyl groups, carboxyl groups, carbon-carbon double bonds, and the like. Also, these compounds may be processed by at least one of chlorination, bromination, and iodination.

Examples of the ether compound containing a carbon-carbon unsaturated group includes vinyl ether compounds (Ia-1), allyl ether compounds (Ia-2), and compounds (Ia-3) containing another unsaturated group.

The vinyl ether compounds (Ia-1) are specifically one or more of methyl vinyl ether, ethyl vinyl ether, n-propyl vinyl ether, isopropyl vinyl ether, n-butyl vinyl ether, tert-butyl vinyl ether, iso-butyl vinyl ether, 2-ethylhexyl vinyl ether, n-hexyl vinyl ether, n-octyl vinyl ether, cyclohexyl vinyl ether, 4-hydroxy butyl vinyl ether, 3-hydroxypropyl vinyl ether, 2-hydroxyethyl vinyl ether, methyl vinyl ether, 3-hydroxybutyl vinyl ether, 2-hydroxy-2-methylpropyl vinyl ether, 5-hydroxypentyl vinyl ether, 6-hydroxyhexyl vinyl ether, benzyl vinyl ether, and 2-chloroethyl vinyl ether.

The allyl ether compounds (Ia-2) are specifically one or more of ethyl allyl ether, butyl allyl ether, cyclohexyl allyl ether, benzyl allyl ether, 2-hydroxyethyl allyl ether, 4-hydroxybutyl allyl ether, and glycerol allyl ether.

The compounds (Ia-3) containing another unsaturated group are specifically one or more of benzyl isopropenyl ether, 1,4-butanediol divinyl ether, and isopropenyl methylether.

The monomer represented by the formula (Ib) is an unsaturated carboxylic acid or a salt or an ester thereof, represented by the following formula (Ib):

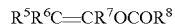
$$R^5R^6C\!=\!CR^7OCOR^8$$

wherein $R^5$, $R^6$, and $R^7$ are the same as or different from each other, and each are H or a C1 to C6 alkyl group which may have a ring structure; and $R^8$ is H, a C1 to C20 alkyl group which may have a functional group and/or a ring structure, or a C6 to C20 aryl group which may have a functional group.

In the formula (Ib), examples of the ring structure of the alkyl group for $R^5$ to $R^8$ include cyclohexyl groups and aryl groups. The functional group of $R^8$ can be exemplified by hydroxyl groups, carboxyl groups, carbon-carbon double bonds, and the like. Also, these compounds may be processed by at least one of chlorination, bromination, and iodination.

Examples of the unsaturated carboxylic acid or a salt or an ester thereof (Ib) include vinyl esters (Ib-1), (meta)acrylic acids and salts or esters thereof (Ib-2), and other unsaturated carboxylic acids and salts or esters thereof (Ib-3).

The vinyl esters (Ib-1) are specifically one or more of vinyl benzoate, vinyl acetate, vinyl formate, vinyl pivalate, vinyl itaconate, vinyl caproate, vinyl caprylate, vinyl neononanate, vinyl neodecanoate, Veova 9 (vinyl versatate ester formed from a C9 carboxylic acid, produced by Shell Chemicals Japan Ltd.), Veova10 (vinyl versatate ester formed from a C10 carboxylic acid, produced by Shell Chemicals Japan Ltd.), vinyl caprate, vinyl 2-ethylhexanoate, vinyl p-tert-butyl benzoate, vinyl salicylate, vinyl butyrate, divinyl adipate, vinyl laurate, vinyl myristate, vinyl palmitate, vinyl stearate, vinyl oleate, vinyl cyclohexyl carboxylate, vinyl chloro acetate, and isopropenyl acetate.

The (meta)acrylic acid and salts or esters thereof (Ib-2) are specifically one or more of acrylic acid, methacrylic acid, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, methyl 3,3-dimethylacrylate, methyl 3,3-dimethylmethacrylate, glycidyl acrylate, glycidyl methacrylate, and 2-hydroxyethyl acrylate.

The other unsaturated carboxylic acids and salts or esters thereof (Ib-3) are specifically one or more of crotonic acid and undecylenic acid.

The monomer represented by the formula (Ic) is an olefin represented by the following formula (Ic):

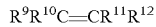

wherein $R^9$, $R^{10}$, and $R^{11}$ are the same as or different from each other, and each are H or a C1 to C6 alkyl group which may have a ring structure; and $R^{12}$ is a C1 to C20 alkyl group which may have a functional group and/or a ring structure, or a C6 to C12 aryl group which may contain a functional group.

In the formula (Ic), the ring structure of the alkyl group for $R^9$ to $R^{12}$ includes cyclohexyl groups and aryl groups. The functional group for $R^{12}$ can be exemplified by hydroxyl groups, carboxyl groups, and carbon-carbon double bonds. Also, these compounds may be processed by at least one of chlorination, bromination, and iodination.

Specific examples of the olefin of the formula (Ic) include ethylene, propylene, 1-butene, 2-butene, isobutylene, cyclobutene, 3-methyl-1-butene, cyclopentene, cycloheptene, cyclohexene, cyclooctene, vinyl chloride, vinylidene chloride, vinyl bromide, butadiene, isoprene, chloroprene, styrene, 2,3-dimethyl-2-butene, and 2-methyl-2-butene.

The copolymer of 2,3,3,3-tetrafluoropropene (A) and a non-fluorinated ethylenic hydrocarbon monomer (B) can be either a random copolymer or an alternating copolymer, depending on the kind of the ethylenic hydrocarbon monomer (B) used.

The copolymerization ratio (mol % ratio) of 2,3,3,3-tetrafluoropropene (A):non-fluorinated ethylenic hydrocarbon monomer (B) is 99.9:0.1 to 0.1:99.9 or 99:1 to 1:99, although the ratio varies depending on the kind and amount of the ethylenic hydrocarbon monomer (B).

The number average molecular weight of the copolymer according to the present invention is in the range of 1000 to 1000000, in the range of 2000 to 900000, or in the range of 3000 to 800000, although it varies depending on the kind and amount of the ethylenic hydrocarbon monomer (B); the kind of the solvent; and the kind, amount, and polymerization temperature of the radical polymerization initiator. In the case where a solution polymerization is employed, the number average molecular weight of the copolymer mainly used is not more than 100000, for example.

The following describes the production method of the copolymer of the present invention.

The copolymerization of 2,3,3,3-tetrafluoropropene (A) and a non-fluorinated ethylenic hydrocarbon monomer (B) of the present invention can be produced with a radical polymerization initiator via a radical polymerization, with or without using a polymerization solvent.

The polymerization method is not limited as long as it proceeds based on a usual radical reaction, such as block polymerization, solution polymerization, emulsion polymerization, and suspension polymerization.

In the present invention, the radical polymerization initiator is not particularly limited, and it may be either organic or inorganic, and also may be either fluorinated or non-fluorinated. Also, the polymerization can be initiated by the methods using heat, light, radial rays, and the like. One of these may be appropriately selected.

Examples of usable polymerization initiators include persulfates such as ammonium persulfate and potassium persulfate (a reducing agent such as sodium bisulfite, sodium pyrosulfife, cobalt naphthenate, and dimethylaniline can be further used in combination as needed); redox initiators formed from an oxidizer (such as ammonium peroxide and potassium peroxide), a reducing agent (such as sodium sulfite), and a transition metal salt (such as iron sulfate); diacyl peroxides such as acetyl peroxide and benzoyl peroxide; dialkoxy carbonyl peroxides such as isopropoxycarbonyl peroxide and tert-butoxycarbonyl peroxide; ketone peroxides such as methyl ethyl ketone peroxide and cyclohexanone peroxide; hydroperoxides such as hydrogen peroxide, tert-butyl hydroperoxide, and cumene hydroperoxide; dialkyl peroxides such as di-tert-butyl peroxide and dicumyl peroxide; alkyl peroxy esters such as tert-butyl peroxyacetate and tert-butyl peroxypivalate; and azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile], and 4,4'-azobis (4-cyanopentanoic acid).

For the polymerization solvent, water is used in the emulsion polymerization method, and water, tert-butanol, 1,1,2-trichloro-1,2,2-trifluoroethane, 1,2-dichloro-1,1,2,2-tetrafluoroethane, a mixture of these, or the like is used in the suspension polymerization method. In the solution polymerization method, examples of usable polymerization solvents include esters such as methyl acetate, ethyl acetate, propyl acetate, and butyl acetate; ketones such as acetone, methyl ethyl ketone, and cyclohexanone; aliphatic hydrocarbons such as hexane, cyclohexane, octane, nonane, decane, undecane, dodecane, and mineral spirits; aromatic hydrocarbons such as benzene, toluene, xylene, naphthalene, and solvent naphtha; alcohols such as methanol, ethanol, tert-butanol, iso-propanol, and ethylene glycol monoalkyl ethers; cyclic ethers such as tetrahydrofuran, tetrahydropyran, and dioxane; fluorine solvents such as HCFC225 and HCFC141b; dimethyl sulfoxide; and mixtures of these.

The polymerization temperature may be appropriately determined according to the kinds of the ethylenic hydrocarbon monomer (B) and the like, and is usually 0° C. to 150° C., and preferably 5° C. to 95° C. in any polymerization methods. The polymerization pressure is usually 0.1 to 10 MPaG (1 to 100 kgf/cm²G) in any polymerization methods.

Since the copolymer of the present invention contains the 2,3,3,3-tetrafluoropropene (A) units, the copolymer has excellent properties in transparency, weather resistance, chemical resistance, and solvent resistance. Therefore, the copolymer can be expected to have various applications as a substitute for a copolymer of tetrafluoroethylene (TFE) and an ethylenic hydrocarbon monomer, and a copolymer of chlorotrifluoroethylene (CTFE) and an ethylenic hydrocarbon monomer.

EXAMPLES

Hereinafter, the present invention will be described in more detail based on examples. However, the examples are not intended to limit the scope of the present invention.

The following are the devices used for evaluation of the physical properties and the measurement conditions.
(1) NMR Analysis
  Measurement device: a product of Varian, Inc.
  $^1$H-NMR measurement condition: 400 MHz (tetramethylsilane=0 ppm)
  $^{19}$F-NMR measurement condition: 376 MHz (trichlorofluoromethane=0 ppm)
  Measurement temperature: room temperature
(2) Elemental Analysis (Fluorine Content)
  Automatic quick furnace (AQF-100, produced by Mitsubishi Chemical Corporation) provided with an ion chromatograph (ICS-1500 Ion Chromatography System, produced by Dionex Corporation)
  Sample: 3 mg
(3) Molecular Weight (Number Average Mn, Weight Average Mw)
  Measurement device: Shodex GPC-104, produced by Showa Denko K. K.
  Measurement condition: Tetrahydrofuran is used as an eluate, and a polystylene with a known molecular weight is used as a standard sample for molecular weight determination.
(4) Glass Transition Temperature and Crystalline Melting Point
  In accordance with ASTM E1356-98, a glass transition temperature and a crystalline melting point are determined from heat absorption in a second run by a midpoint method, using a DSC measurement device produced by Mettler Toledo K. K.
  Measurement Conditions
  Rate of temperature rise: 20° C./min
  Amount of sample: 10 mg
  Heat cycle: −100° C. to 150° C., heating, cooling, and heating Example 1

To a 300-mL stainless steel autoclave were added butyl acetate (80 g), hydroxybutyl vinyl ether (HBVE, 20.3 g), and Perbutyl PV (a peroxide radical polymerization initiator produced by NOF Corporation, 0.21 g). The air in the autoclave was substituted with nitrogen and then cooled to 5° C. Subsequently, 2,3,3,3-tetrafluoropropene (30 g) was added to the autoclave. The inside of the autoclave was heated to 60° C. with stirring, whereby the reaction was initiated. The reaction was performed for 7 hours with keeping the temperature in the autoclave at 60° C. Then temperature and pressure in the autoclave were brought to the ambient temperature and pressure to terminate the copolymerization, whereby 128 g of a butyl acetate solution of a fluorocopolymer (solid content concentration: 31 mass %) was produced. The produced copolymer had a glass transition temperature of 14° C., a number average molecular weight (Mn) of 7300, and a fluorine content of 62 mass %, and the copolymerization ratio (mol % ratio) thereof was 2,3,3,3-tetrafluoropropene/HBVE=62/38. In addition, the copolymer was amorphous with no crystalline melting point observed.
  $^1$H-NMR (300.133 MHz, acetone-d6): 5.6 to 5 ppm (CH); 4.4 to 3.3 ppm (4H); 2.6 to 1.4 ppm (8H)
  $^{19}$F-NMR (282.40 MHz, acetone-d6): −78 to −84 ppm (CF$_3$); −160 to −178 ppm, −196 to −206 ppm (CF)

Example 2

To a 300-mL stainless steel autoclave were added butyl acetate (80 g), ethyl vinyl ether (EVE, 12.6 g), and Perbutyl PV (0.21 g). The air in the autoclave was substituted with nitrogen and then cooled to 5° C. Subsequently, 2,3,3,3-tetrafluoropropene (30 g) was added to the autoclave. The inside of the autoclave was heated to 60° C. with stirring, whereby the reaction was initiated. The reaction was performed for 8 hours with keeping the temperature in the autoclave at 60° C. Then temperature and pressure in the autoclave were brought to the ambient temperature and pressure to terminate the polymerization, whereby 120 g of a butyl acetate solution of a fluorocopolymer (solid content concentration: 23.9 mass %) was produced. The produced copolymer had a glass transition temperature of −1° C., a number average molecular weight (Mn) of 3100, and a fluorine content of 72 mass %, and the copolymerization ratio (mol % ratio) thereof was 2,3,3,3-tetrafluoropropene/EVE=62/38. In addition, the copolymer was amorphous with no crystalline melting point observed.
  $^1$H-NMR (300.133 MHz, acetone-d6): 5.6 to 5 ppm (CH); 4.2 to 3.8 ppm (CH$_2$); 3.6 to 3.2 ppm (CH$_2$); 3.0 to 1.8 ppm (CH$_2$); 1.4 to 1.0 ppm (CH$_3$)
  $^{19}$F-NMR (282.40 MHz, acetone-d6): −78 to −84 ppm (CF$_3$); −160 to −178 ppm, −196 to −206 ppm (CF)

Example 3

To a 300-mL stainless steel autoclave were added butyl acetate (80 g), vinyl acetate (15.1 g), and Perbutyl PV (0.21 g). The air in the autoclave was substituted with nitrogen and then cooled to 5° C. Subsequently, 2,3,3,3-tetrafluoropropene (30 g) was added to the autoclave. The inside of the autoclave was heated to 60° C. with stirring, whereby the reaction was initiated. The reaction was performed for 15 hours with keeping the temperature in the autoclave at 60° C. Then temperature and pressure in the autoclave were brought to the ambient temperature and pressure to terminate the polymerization, whereby 122 g of a butyl acetate solution of a fluorocopolymer (solid content concentration: 27.6 mass %) was produced. The produced copolymer had a glass transition temperature of 21.5° C., a number average molecular weight (Mn) of 29000, and a fluorine content of 56 mass %, and the copolymerization ratio (mol % ratio) thereof was 2,3,3,3-tetrafluoropropene/vinyl acetate=51/49. In addition, the copolymer was amorphous with no crystalline melting point observed.
  $^1$H-NMR (300.133 MHz, acetone-d6): 5.7 to 5.1 ppm (CH); 3.0 to 2.1 ppm (4H); 2.1 to 1.8 ppm (CH$_3$)

Example 4

To a 300-mL stainless steel autoclave were added butyl acetate (80 g), 1-decene (15.2 g), and Perbutyl PV (a peroxide radical polymerization initiator produced by NOF Corporation, 0.21 g). The air in the autoclave was substituted with nitrogen and then cooled to 5° C. Subsequently, 2,3,3,3-tetrafluoropropene (18.6 g) was added to the autoclave. The inside of the autoclave was heated to 60° C. with stirring, whereby the reaction was initiated. After the reaction was performed for 16 hours with keeping the temperature in the autoclave at 60° C., temperature and pressure in the autoclave were brought to the ambient temperature and pressure to terminate the polymerization. Thereby, 105.9 g of a butyl acetate solvent of a 2,3,3,3-tetrafluoropropene/1-decene copolymer (solid content concentration: 1.5 mass %) was produced.

Example 5

To a 300-mL stainless steel autoclave were added butyl acetate (80 g), methyl methacrylate (17.5 g), and Perbutyl PV (0.21 g). The air in the autoclave was substituted with nitrogen and then cooled to 5° C. Subsequently, 2,3,3,3-tetrafluoropropene (30 g) was added to the autoclave. The inside of the autoclave was heated to 60° C. with stirring, whereby the reaction was initiated. After the reaction was performed for 14 hours with keeping the temperature in the autoclave at 60° C., temperature and pressure in the autoclave were brought to the ambient temperature and pressure to terminate the polymerization. Thereby, 115.71 g of a butyl acetate solution of a fluorocopolymer (solid content concentration: 12.2 mass %) was produced. The produced copolymer had a glass transition temperature of 97° C., a number average molecular weight (Mn) of 19000, a weight average molecular weight (Mw) of 35000, and a fluorine content of 1.7 mass %, and the copolymerization ratio (mol % ratio) thereof was 2,3,3,3-tetrafluoropropene/methyl methacrylate=2/98.

$^{19}$F-NMR (282.40 MHz, acetone-d6): −78 to −82 ppm (CFA; −170 to −180 ppm (CF)

The invention claimed is:
1. A copolymer of
  (A) 2,3,3,3-tetrafluoropropene and
  (B) a non-fluorinated ethylenic hydrocarbon monomer,
  the copolymer having a copolymerization ratio in mol % of
    (A) and (B) of 99.9:0.1 to 0.1:99.9, and
  a number average molecular weight of 1000 to 1000000;
  wherein the non-fluorinated ethylenic hydrocarbon monomer (B) is at least one compound selected from the group consisting of allyl ether compounds, benzyl isopropenyl ether, 1,4-butanediol divinyl ether, isopropenyl methylether crotonic acid, undecylenic acid and 1-decene.

* * * * *